United States Patent [19]

Szabo et al.

[11] 3,948,783

[45] Apr. 6, 1976

[54] PROCESS FOR THE SECONDARY AND TERTIARY RECOVERY OF PETROLEUM

[75] Inventors: Miklos Tamas Szabo, Pittsburgh; Lawrence James Guilbault, McMurray; Nancy Spicer Sherwood, Pittsburg, all of Pa.

[73] Assignee: Calgon Corporation, Pittsburgh, Pa.

[22] Filed: Apr. 30, 1974

[21] Appl. No.: 465,658

[52] U.S. Cl............ 252/8.55 D; 166/274; 166/275; 252/316; 260/875; 260/885
[51] Int. Cl.$^2$.......................................... E21B 43/20
[58] Field of Search ....... 252/8.55 D; 166/273, 274, 166/275; 260/875

[56] References Cited
UNITED STATES PATENTS

| | | | |
|---|---|---|---|
| 3,085,063 | 4/1963 | Turbak | 252/8.55 |
| 3,336,977 | 8/1967 | Amott | 166/274 |
| 3,343,601 | 9/1967 | Pye | 166/275 X |
| 3,776,310 | 12/1973 | Norton et al. | 252/8.55 |
| 3,776,983 | 12/1973 | Iovine et al. | 260/899 X |

OTHER PUBLICATIONS

Guilbault et al., Article in J. Macromolecular Science—Chemistry, A7, (8), 1973, pp. 1581–1590.

Primary Examiner—Herbert B. Guynn
Attorney, Agent, or Firm—Rudolph J. Anderson, Jr.; Harry E. Westlake; Martin L. Katz

[57] ABSTRACT

Improved secondary and tertiary oil recovery process in which water-soluble, salt-insensitive, block polymers of the A-B-A type wherein the A block is derived from a water-soluble monomer and the B block is derived from N-vinyl pyrrolidone are used as viscosity control agents.

3 Claims, 2 Drawing Figures

PROCESS FOR THE SECONDARY AND TERTIARY RECOVERY OF PETROLEUM

This invention relates to an improved secondary and tertiary oil recovery process.

More particularly, this invention relates to the use of water-soluble polymeric compositions of the A-B-A type wherein the A block represents from 10 to 100,000 mer units of a watersoluble monomer and the B block represents from 10 to 5,000 mer units of N-vinyl pyrrolidone as viscosity control agents in secondary and tertiary oil recovery processes.

The most common practice of improving waterflooding operations is to inject into the waterflood a single agent to effect a reduction in mobility and increase the recovered oil. Generally, this agent is a partially hydrolyzed, high molecular weight polyacrylamide such as is disclosed in U.S. Pat. Nos. 2,827,964 and 3,039,529. It has also been proposed in U.S. Pat. No. 3,724,545, to improve mobility control in waterflooding by injecting at least two separate polymer slugs, the first slug containing a permeability-reducing agent and the second slug containing a viscosity-increasing agent.

In accordance with this invention, a block polymer of the A-B-A type wherein the A block is derived from a water-soluble monomer and the B block is derived from N-vinyl pyrrolidone, is used as a viscosity control agent to improve oil recovery in secondary and tertiary recovery processes.

Furthermore, in many situations, brines are used as the waterflooding medium. The partially hydrolyzed, high molecular weight polyacrylamides are somewhat brine or salt sensitive and show substantial decreases in viscosity in increasing concentrations of brine.

Accordingly, it is an object of this invention to provide a brine insensitive viscosity-increasing agent for use in oil recovery operations.

Water-soluble block polymers are disclosed in U.S. Pat. No. 3,776,983 and water-soluble mixtures of polyalkeneoxide and polyvinylpyrrolidones are disclosed in U.S. Pat. No. 3,776,310 as being mobility control agents in oil recovery processes. However, heretofore the block polymers of the instant invention have not been used in secondary and tertiary oil recovery processes.

The ceric ion method taught by U.S. Pat. No. 2,922,768 and J. Macromolecular Science-Chemistry, A7(8), 1581 (1973) has been found to be a convenient means of accomplishing the block copolymer synthesis of the instant inventions.

Suitable water-soluble monomers include dimethyl diallyl ammonium chloride, 3-acrylamido-3-methyl butyl trimethyl ammonium chloride, methacryloyloxy-2-hydroxypropyl trimethyl ammonium chloride, methacryloyloxyethyl trimethyl ammonium chloride, methacryloyloxyethyl trimethyl ammonium methosulfate, 2-acrylamido-2-methyl propane sulfonic acid, acrylic acid and salts thereof, methacrylic acid, 3-acrylamido-3-methyl butyl dimethylamine, acrylamide, methacrylamide, diacetone acrylamide, hydroxymethylated diacetone acrylamide, dimethyl-1-(2-hydroxypropyl) amine methacrylamide, and sodium styrene sulfonate.

The preferred monomers, however, are 3-acrylamido-3-methyl butyl trimethyl ammonium chloride, 2-acrylamido-2-methyl propane sulfonic acid, dimethyl diallyl ammonium chloride, methacryloyloxyethyl trimethyl ammonium chloride, methacryloyloxyethyl trimethyl ammonium methosulfate, acrylamide, acrylic acid and combinations thereof.

In carrying out the process of this invention, the block polymers are incorporated in the flooding medium in any conventional manner in amounts of from about 0.001 to about 1 percent by weight polymer, preferably from about 0.005 to about 0.15 percent by weight polymer. Oxygen can be removed from the flooding medium, if desired, by mechanical means such as vacuum deaeration or counter-current gas stripping or by chemical means such as the addition of an oxygen scavenger such as sodium sulfite or hydrazine.

The invention will be better understood by the following examples which illustrate the preparation and effectiveness of representative polymers in the oil recovery process of this invention.

EXAMPLE 1

Preparation of Poly(Vinylpyrrolidone-b-Acrylamide)

Figure 1:
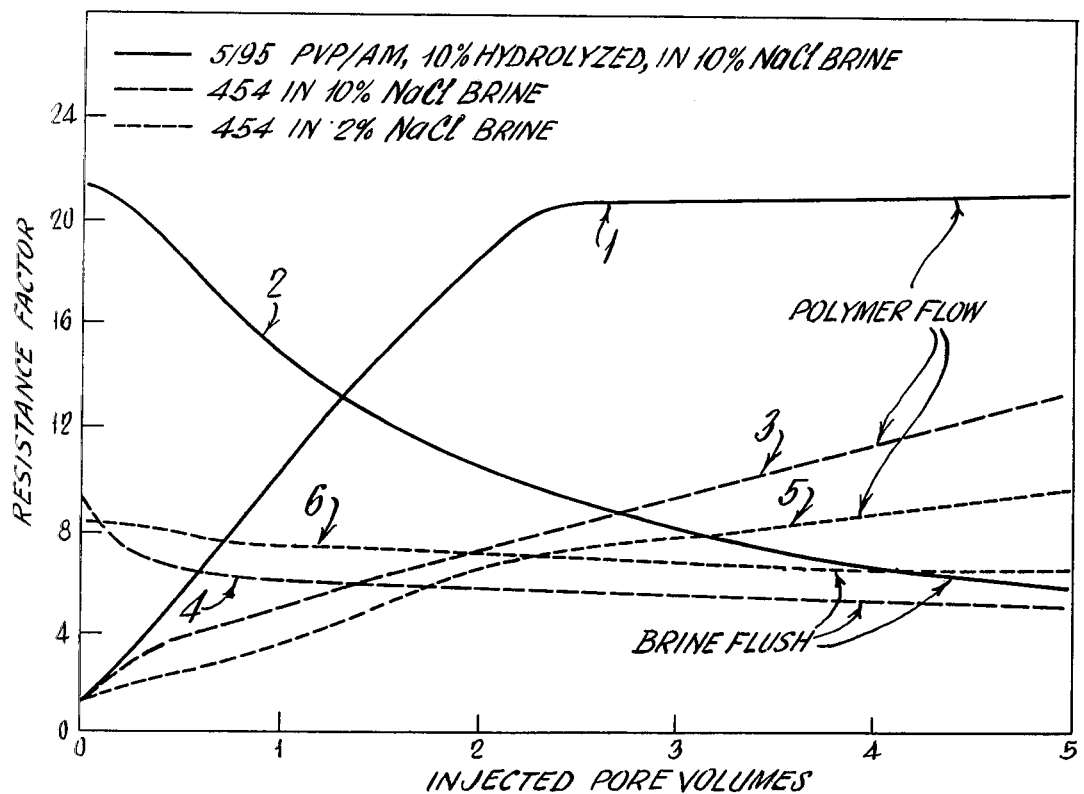
FIG. 1 shows the resistance factor vs. injected pore volumes data for a set of comparative tests.

A one liter, 4-neck flask fitted with a mechanical stirrer, condenser, nitrogen inlet and catalyst addition tube was charged with 16.00 g. acrylamide, 2.78 g. poly(vinylpyrrolidone), m.w. = 360,000 and 500 ml distilled water. After stirring the contents for an hour under a nitrogen purge, a solution of 0.123 g. ceric ammonium nitrate, 2.25 ml 1 N $HNO_3$ and 10 ml water was added dropwise over a three hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 86percent yield, exhibited an intrinsic viscosity in 1 N $NaNO_3$ of 6.3 dl/g. The composition of the block polymer, determined by infrared analysis was 90 mole percent acrylamide, 10 mole percent vinylpyrrolidone. The following equation (Guilbault and Brooks, J. Macromolecular Science-Chemistry, A7(8), 1581 [1973]) was employed to calculate the molecular weight of the acrylamide end blocks:

$$G = \left(\frac{S}{C} - S\right)/N$$

Where
$G$ = d.p. of the end blocks
$S$ = d.p. of poly(vinylpyrrolidone)= 3200
$N$ = no. of end blocks per poly(vinylpyrrolidone) block = 2
$C$ = composition, as mole fraction vinylpyrrolidone The block polymer structure calculated by this method was:

-continued (Polyacrylamide)―(―Polyvinylpyrrolidone―)―(―Polyacrylamide)
Mol. Wt.   $1 \times 10^6$   $3.6 \times 10^5$   $1 \times 10^6$

EXAMPLE 2

Preparation of Poly(Vinylpyrrolidone-b-Acrylamide)

A one liter, 4-neck flask fitted with a mechanical stirrer, condenser, nitrogen inlet and catalyst addition tube was charged with 6.75 g. acrylamide, 0.56 g. poly(vinylpyrrolidone), m.w. = 360,000 and 100 ml distilled water. After stirring the contents for an hour under a nitrogen purge, a solution of 0.052 g. ceric ammonium nitrate, 0.95 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 90 percent yield, exhibited an intrinsic viscosity in 1 N $NaNO_3$ of 7.5 dl/g. The composition of the block polymer, determined by infrared analysis was 95 mole percent acrylamide, 5 mole percent vinylpyrrolidone.

The block polymer structure, calculated by the method of Example 1 was:

(Polyacrylamide)―(―Polyvinylpyrrolidone―)―(―Polyacrylamide)
Mol. Wt.   $22 \times 10^5$   $3.6 \times 10^5$   $22 \times 10^5$

EXAMPLE 3

Preparation of poly(Vinylpyrrolidone-b-Acrylamide)

A one liter, 4-neck flask fitted with a mechanical stirrer, condenser, nitrogen inlet and catalyst addition tube was charged with 13.33 g. acrylamide, 6.95 g. poly(vinylpyrrolidone), m.w. = 360,000 and 500 ml distilled water. After stirring the contents for an hour under a nitrogen purge, a solution of 0.103 g. ceric ammonium nitrate, 1.88 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 85 percent yield, exhibited an intrinsic viscosity in 1 N $NaNO_3$ of 3.2 dl/g. The composition of the block polymer, determined by infrared analysis was 73 mole percent acrylamide, 27 mole percent vinylpyrrolidone.

The block polymer structure, calculated by the method of Example 1 was:

(Polyacrylamide)―(―Polyvinylpyrrolidone―)―(―Polyacrylamide)
Mol. Wt.   $3.1 \times 10^5$   $3.6 \times 10^5$   $3.1 \times 10^5$ Extraction experiments demonstrated that the polyvinylpyrrolidone present in the product is incorporated into the block polymer structure. A sample (6.22 g.) of a 27.9 mole percent vinylpyrrolidone block polymer was extracted with refluxing methanol (a good solvent for polyvinylpyrrolidone) in a Soxhlet Thimble for 24 hours. The extracted sample weighed 6.20 g. and analyzed for 27.1 mole percent vinylpyrrolidone.

EXAMPLE 4

Preparation of Poly(Vinylpyrrolidone-b-Acrylamide)

A one liter, 4-neck flask fitted with a mechanical stirrer, condenser, nitrogen inlet and catalyst addition tube was charged with 8.88 g. acrylamide, 13.88 g poly(vinylpyrrolidone), m. w. = 360,000 and 500 ml distilled water. After stirring the contents for an hour under a nitrogen purge, a solution of 0.069 g. ceric ammonium nitrate, 1.25 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 83 percent yield, exhibited an intrinsic viscosity in 1 N $NaNO_3$ of 3.4 dl/g. The composition of the block polymer, determined by infrared analysis was 56 mole percent acrylamide, 44 mole percent vinylpyrrolidone.

The block polymer structure, calculated by the method of Example 1 was:

(Polyacrylamide)―(―Polyvinylpyrrolidone―)―(―Polyacrylamide)
Mol. Wt.   $1.4 \times 10^5$   $3.6 \times 10^5$   $1.4 \times 10^5$

EXAMPLE 5

Preparation of Poly(Vinylpyrrolidone-b-Acrylamide)

A one liter, 4-neck flask fitted with a mechanical stirrer, condenser, nitrogen inlet and catalyst addition tube was charged with 5.33 g. acrylamide, 19.43 g. poly(vinylpyrrolidone), m.w. = 360,000 and 500 ml distilled water. After stirring the contents for an hour under a nitrogen purge, a solution of 0.041 g. ceric ammonium nitrate, 0.75 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 54 percent yield, exhibited an intrinsic viscosity in 1 N $NaNO_3$ of 3.5 dl/g. The composition of the block polymer, determined by infrared analysis was 50 mole percent acrylamide, 50 mole percent vinylpyrrolidone.

The block polymer structure, calculated by the method of Example 1 was:

(Polyacrylamide—)(—Polyvinylpyrrolidone—)(—Polyacrylamide)
Mol. Wt.      $1.1 \times 10^5$        $3.6 \times 10^5$        $1.1 \times 10^5$

EXAMPLE 6

Preparation of Poly(Vinylpyrrolidone-b-2-Acrylamido-2-Methyl Propane Sulfonic Acid)

This polymer was prepared in a manner analogous to Example 1, using 5.18 g. 2-acrylamido-2-methyl propane sulfonic acid, 8.33 g. poly(vinylpyrrolidone), m.w. = 360,000 and 100 ml water. The catalyst solution contained 0.25 ml 1 N $HNO_3$, 0.014 g. ceric ammonium nitrate and 10 ml water. The product, obtained in 76 percent yield, was isolated from the reaction gel by precipitation into acetone. Utilizing the equation of Example 1, the molecular weight of each end block was found to be $1 \times 10^5$, and that of the poly(vinylpyrrolidone) center block, $3.6 \times 10^5$. The block polymer contained 24 mole percent anionic monomer units, as measured by infrared analysis.

EXAMPLE 7

Preparation of Poly(Vinylpyrrolidone-b-2-Acrylamido-2-Methyl Propane Sulfonic Acid)

This polymer was prepared in a manner analogous to Example 1, using 15.53 g. 2-acrylamido-2-methyl propane sulfonic acid, 2.78 g. poly(vinylpyrrolidone), m.w. = 360,000 and 100 ml water. The catalyst solution contained 0.75 ml 1 N $HNO_3$, 0.041 g. ceric ammonium nitrate and 10 ml water. The product, obtained in 54 percent yield was isolated from the reaction gel by precipitation into acetone. Utilizing the equation of Example 1, the molecular weight of each end block was found to be $4.8 \times 10^5$, and that of the poly(vinylpyrrolidone) center block, $3.6 \times 10^5$. The block polymer contained 60 mole percent anionic monomer units, as measured by infrared analysis.

EXAMPLE 8

Preparation of Poly(Vinylpyrrolidone-b-2-Acrylamido-2-Methyl Propane Sulfonic Acid)

This polymer was prepared in a manner analogous to Example 1, using 10.35 g. 2-acrylamido-2-methyl propane sulfonic acid, 5.55 g. poly(vinylpyrrolidone), m.w. = 360,000 and 100 ml water. The catalyst solution contained 0.50 ml 1 N $HNO_3$, 0.027 g. ceric ammonium nitrate and 10 ml water. The product, obtained in 61% yield was isolated from the reaction gel by precipitation into acetone. Utilizing the equation of Example 1, the molecular weight of each end block was found to be $2.1 \times 10^5$, and that of the poly(vinylpyrrolidone) center block, $3.6 \times 10^5$. The block polymer contained 39 mole percent anionic monomer units, as measured by infrared analysis.

EXAMPLE 9

Preparation of Poly(vinylpyrrolidone-b-Methacryloyloxyethyl Trimethyl Ammonium Chloride)

This polymer was prepared as in Example 1, using 10.86 g. of the cationic monomer, 5.55 g. poly(vinylpyrrolidone), m.w. = 360,000 and 100 ml water. The catalyst solution, comprised of 0.50 ml 1 N $HNO_3$, 0.274 g. ceric ammonium nitrate and 10 ml water, was added at the beginning of the reaction. The product was obtained in 78 percent yield by precipitation of the reaction mixture into acetone. The block polymer contained 51 mole percent cationic monomer units, as measured by chloride titration. Utilizing the equation of Example 1, the molecular weight of each end block was found to be $3.4 \times 10^5$, and that of the poly(vinylpyrrolidone) center block $3.6 \times 10^5$.

EXAMPLE 10

Preparation of Poly(Vinylpyrrolidone-b-Methacryloyloxyethyl Trimethyl Ammonium Chloride)

This polymer was prepared as in Example 1, using 16.30 g. of the cationic monomer, 2.78 g. poly(vinylpyrrolidone), m.w. = 360,000 and 100 ml water. The catalyst solution, comprised of 2.5 ml 1 N $HNO_3$, 1.37 g. ceric ammonium nitrate and 10 ml water, was added at the beginning of the reaction. The product was obtained in 63 percent yield by precipitation of the reaction mixture into acetone. The block polymer contained 80 mole percent cationic monomer units, as measured by chloride titration. Utilizing the equation of Example 1, the molecular weight of each end block was found to be $13 \times 10^5$, and that of the poly(vinypyrrolidone) center block $3.6 \times 10^5$.

EXAMPLE 11

Preparation of Poly(Vinylpyrrolidone-b-Methacryloyloxyethyl Trimethyl Ammonium Chloride)

This polymer was prepared as in Example 1, using 5.44 g. of the cationic monomer, 8.33 poly(vinylpyrrolidone), m.w. = 360,000 and 100 ml water. The catalyst solution, comprised of 0.75 ml 1 N $HNO_3$, 0.411 g. ceric ammonium nitrate and 10 ml water, was added at the beginning of the reaction. The product was obtained in 89 percent yield by precipitation of the reaction mixture into acetone. The block polymer contained 20 mole percent cationic monomer units, as measured by chloride titration. Utilizing the equation of Example 1, the molecular weight of each end block was found to be $0.8 \times 10^5$, and that of the poly(vinylpyrrolidone) center block $3.6 \times 10^5$.

The following examples illustrate the viscosity-improving properties of the process of this invention.

EXAMPLE 12

Polymer solutions were prepared by dissolving in salt water having varying salt concentrations a block polymer of the formula:

(Polyacrylamide—)(—Polyvinylpyrrolidone—)(—Polyacrylamide)
Mol. Wt.      1,020,000        360,000        1,020,000 having 10 mole percent polyvinylpyrrolidone. After mixing, the viscosity of the polymer solutions was measured with a Brookfield Model LVT with U.L. Adapter at varying shear rates. Table I shows the effect of sodium chloride concentration on solution viscosities, Table II shows the effect of shear rate on solution viscosities and Table III compares the solution viscosities of a high molecular weight, partially hydrolyzed polyacrylamide (PAM) with a block polymer of the above formula and illustrates the stability of these block polymers.

Table I

Brookfield Viscosities, cp,
U.L. Adapter, 25°C., 60 rpm

| Polymer Concentration | NaCl Concentration | | |
|---|---|---|---|
| | 0.1% | 2% | 10% |
| 300 ppm | 1.290 | 1.310 | — |
| 600 ppm | 1.560 | 1.605 | 1.815 |
| 1,000 ppm | 1.860 | 2.018 | — |

Table II

Brookfield Viscosities, cp,
U.L. Adapter, 25°C., 60 rpm, 600 ppm Polymer

| rpm | NaCl Concentration | |
|---|---|---|
| | 0.1% | 10% |
| 1.5 | 2.00 | 2.40 |
| 3 | 2.00 | 2.10 |
| 6 | 1.70 | 1.96 |
| 12 | 1.70 | 1.98 |
| 30 | 1.613 | 1.97 |
| 60 | 1.56 | 1.815 |

Table III

Brookfield Viscosities, cp,
U.L. Adapter, 60 rpm, 600 ppm Polymer

| Polymer | NaCl Concentration | | |
|---|---|---|---|
| | 0.1% | 2% | 10% |
| PAM | 4.24 | ≈2.00 | 1.95 |
| PVP-AM | 1.56 | 1.605 | 1.815 |

PAM - Polyacrylamide
PVP-AM - Polyvinylpyrrolidone-Acrylamide

EXAMPLE 13

The following table illustrates the solution viscosity of polyvinylpyrrolidone (mol. wt. 360,000)/polyacrylamide (mol. wt. 1,020,000) block polymers of varying compositions by the procedure of Example 12.

Table IV

Brookfield Viscosities, cp,
U.L. Adapter, 60 rpm, 600 ppm Polymer

| Polymer | NaCl Concentration | | |
|---|---|---|---|
| | 0.1% | 2% | 10% |
| PAM | 4.240 | 2.060 | 1.950 |
| PVP/AM (10/90 mole percent) | 1.560 | 1.605 | 1.815 |
| PVP/AM (5/95 mole percent) | 1.887 | 1.910 | 2.200 |
| PVP/AM (5/95 mole percent AM = 10% hydrolyzed) | 4.100 | 2.105 | 2.300 |

EXAMPLE 14

The following table illustrates the solution viscosity properties of a polyvinylpyrrolidone (mol. wt. 360,000) (25 mole percent)/2-acrylamido-2-methyl propane sulfonic acid (mol. wt. 100,000) (75 mole percent) block polymer by the procedure of Example 12.

Table V

Brookfield Viscosities, cp,
U. L. Adapter, 60 rpm, 600 ppm Polymer

| NaCl Concentration | |
|---|---|
| 2% | 10% |
| 1.16 | 1.38 |

EXAMPLE 15

A fine calcium carbonate powder was packed under brine into a plexiglass holder. Thereafter, 600 ppm polymer solution was injected through the pack. The filtrate, after the first four pore volumes of injected polymer solution, was collected in a beaker to be used in the actual test.

For the actual test the same size of calcium carbonate powder was used. A 12 cm pack was made with a cross-sectional area of 28.8 cm$^2$. First, brine is injected through the pack using 7 ft./d. frontal advance rate. The stabilized pressure during brine flow was recorded. Thereafter, five pore volumes of filtered polymer solution were injected through the pack using again 7 ft./d. flow rate. The pressure was measured during polymer solution injection. At the outlet end of the pack, liquid samples were collected for polymer concentration determinations.

After the polymer solution flow cycle, brine was injected through the pack. Pressure readings were taken during the brine flush cycle. Effluent samples were taken for polymer concentration determination.

For each polymer solution, a separate filter and actual pack were made using unused calcium carbonate powder.

FIG. 1 shows the resistance factor vs. injected pore volumes data for a set of comparative tests. The polymer solution flow resistance factor is expressed as:

$$R_p = \frac{\Delta P_p}{\Delta P_B}$$

where
$\Delta P_p$ is the pressure during polymer flow.
$\Delta P_B$ is the pressure during brine flow preceding polymer flow.

The brine flushed resistance factor is expressed as follows:

$$R_{BF} = \frac{\Delta P_{BF}}{\Delta P_B}$$

where $\Delta P_{BF}$ is the pressure during brine flush.

Curve 1 in FIG. 1 shows the polymer solution flow resistance factors obtained with a 5/95 PVP/AM, 10% hydrolyzed polymer, dissolved in 10% NaCl brine. After 2 pore volumes of injected solution stabilized resistance factors were obtained with high absolute values. Curve 2 shows the brine flushed resistance factors as a function of the injected pore volumes of brine. Curve 3 and 4 show a similar test when an 18% hydrolyzed polyacrylamide, a commercial product called Calgon Polymer 454, was used in 10% NaCl brine. Curve 5 and 6 show the test data when Polymer 454 was dissolved in 2% NaCl brine.

Figure 2:
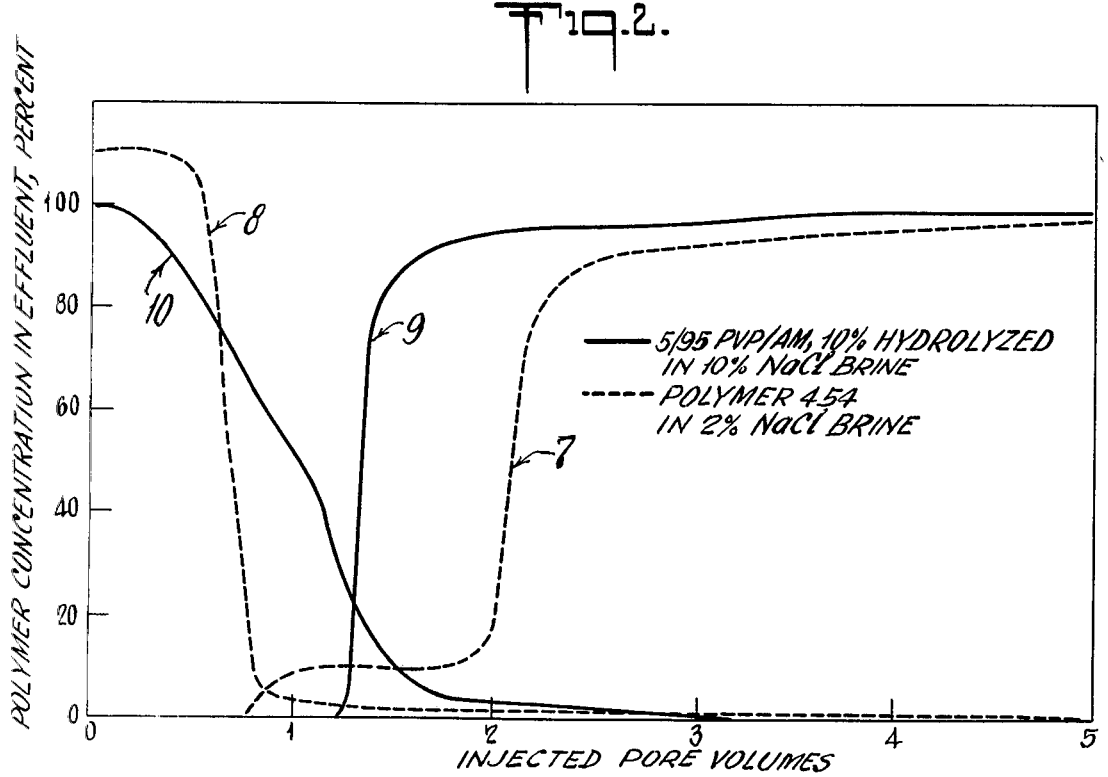
FIG. 2 shows polymer concentration in effluent vs. injected pore volume.

Curve 1 in FIG. 2 shows the effluent polymer concentration data during polymer solution injection when Polymer 454 was used. The effluent concentration values during brine flush are shown with Curve 2.

Curve 3 in FIG. 2 shows the effluent polymer concentration data during polymer solution injection when 5/95 PVP/AM polymer was used. The effluent concentration values during brine flush are shown with Curve 4.

FIGS. 1 and 2 demonstrate that a PVP/AM block copolymer produces higher resistance factor during polymer solution flow with lower polymer retention than that of a commercially used hydrolyzed polyacrylamide.

We claim:

1. A process for the secondary and tertiary recovery of petroleum from subterranean formations penetrated by an injection well and a producing well, which comprises introducing into said reservoir through said injection well a displacing medium comprising water and from about 0.001 to about 1 percent by weight of a block polymer of the formula A-B-A wherein the A block represents from 10 to 100,000 mer units of a water-soluble monomer selected from the group consisting of 3-acrylamido-3-methyl butyl trimethyl ammonium chloride, 2-acrylamido-2-methyl propane sulfonic acid, dimethyl diallyl ammonium chloride, methacryloyloxyethyl trimethyl ammonium chloride, methacryloyloxyethyl trimethyl ammonium methosulfate, and acrylamide and the B block represents from 10 to 5,000 mer units of N-vinyl pyrrolidone.

2. A process as in claim 1 wherein the water-soluble monomer is acrylamide.

3. A process as in claim 1 wherein the water-soluble monomer is 2-acrylamido-2-methyl propane sulfonic acid.

* * * * *